United States Patent
Agarwal et al.

(10) Patent No.: US 10,791,045 B2
(45) Date of Patent: Sep. 29, 2020

(54) VIRTUAL CHANNEL ASSIGNMENT FOR TOPOLOGY CONSTRAINED NETWORK-ON-CHIP DESIGN

(71) Applicant: Arm Limited, Cambridge (GB)

(72) Inventors: Nitin Kumar Agarwal, Bangalore (IN); Zheng Xu, Austin, TX (US); Anup Gangwar, Austin, TX (US)

(73) Assignee: Arm Limited, Cambridge (GB)

( * ) Notice: Subject to any disclaimer, the term of this patent is extended or adjusted under 35 U.S.C. 154(b) by 34 days.

(21) Appl. No.: 16/280,220

(22) Filed: Feb. 20, 2019

(65) Prior Publication Data
US 2020/0267073 A1 Aug. 20, 2020

(51) Int. Cl.
*H04L 12/751* (2013.01)
*H04L 12/721* (2013.01)
*H04W 72/04* (2009.01)

(52) U.S. Cl.
CPC .............. *H04L 45/02* (2013.01); *H04L 45/44* (2013.01); *H04W 72/04* (2013.01)

(58) Field of Classification Search
CPC ........ H04L 45/02; H04L 45/44; H04W 74/00; H04W 72/00; H04W 28/00; H04W 88/00
See application file for complete search history.

(56) References Cited

U.S. PATENT DOCUMENTS

| | | | | |
|---|---|---|---|---|
| 6,829,216 B1 * | 12/2004 | Nakata | ................ | H04J 14/0227 370/228 |
| 9,107,126 B2 * | 8/2015 | Elsherif | ............ | H04W 72/0486 |
| 10,397,928 B1 * | 8/2019 | Hahn | ..................... | H04W 16/18 |
| 2005/0069314 A1 * | 3/2005 | De Patre | ............. | H04J 14/0241 398/5 |
| 2008/0151821 A1 * | 6/2008 | Cho | ....................... | H04W 16/10 370/329 |
| 2009/0097418 A1 * | 4/2009 | Castillo | ............... | H04L 41/5035 370/255 |
| 2011/0292886 A1 * | 12/2011 | Lee | ....................... | H04W 16/04 370/329 |

(Continued)

OTHER PUBLICATIONS

A Supernodal Formulation of Vertex Colouring with Applications in Course Timetabling, by Burke et al, dated Jul. 7, 2009.*

(Continued)

*Primary Examiner* — Nishant Divecha
(74) *Attorney, Agent, or Firm* — Leveque IP Law, P.C.

(57) ABSTRACT

Virtual channel assignment in a network is achieved by constructing a Traffic Conflict Graph (TCG) dependent upon a network interconnect topology. The TCG has vertices corresponding to traffic entries in a network specification and edges that connect pairs of vertices. An edge weight, dependent upon interconnect topology and traffic flow characteristics, is assigned to each edge. The vertices are colored using minimum or soft coloring and the virtual channels are mapped to the traffic entries, according to the resulting colors, to provide a virtual channel assignment. The TCG may be constructed by generating a vertex in the TCG to represent each traffic entry, assigning a traffic flow characteristic of a traffic entry to a corresponding vertex and generating an edge between first and second vertices when a number of 'qualified' common edges, across all routes for corresponding traffic entries, is greater than zero.

20 Claims, 9 Drawing Sheets

(56) References Cited

U.S. PATENT DOCUMENTS

| | | | |
|---|---|---|---|
| 2012/0269510 A1* | 10/2012 | Hui | H04L 27/2697 |
| | | | 398/50 |
| 2015/0124644 A1* | 5/2015 | Pani | H04L 41/082 |
| | | | 370/254 |
| 2017/0048715 A1* | 2/2017 | Fan | H04B 17/318 |
| 2018/0014304 A1* | 1/2018 | Khoshnevisan | H04W 72/0453 |
| 2019/0222668 A1* | 7/2019 | Tulino | H04L 67/06 |
| 2019/0245775 A1* | 8/2019 | Chen | H04L 45/125 |
| 2020/0084114 A1* | 3/2020 | Keppler | H04L 41/16 |

OTHER PUBLICATIONS

Local conflict coloring by Fraigniaud et al. dated Feb. 2, 2017.*
Minimum Interference Channel Assignment in Multi-Radio Wireless Mesh Networks, by Subramanian et al. dated May 2, 2008.*
Vertex Coloring Based Distributed Link Scheduling for Wireless Sensor Networks by Xiaoyang et al. dated Dec. 24, 2012.*
Weighted Coloring based Channel Assignment for WLANs by Mishra et al. dated Jul. 2005.*

* cited by examiner

VIRTUAL CHANNEL ASSIGNMENT FOR TOPOLOGY CONSTRAINED NETWORK-ON-CHIP DESIGN

BACKGROUND

A Network-on-Chip is a communication subsystem on an integrated circuit that enables modules of a data processing system to exchange information. A Network-on-Chip (NoC) may include various building blocks such as Routers, Resizers, Power and Clock Domain Converters (PCDCs), Pipeline elements etc. The process of laying out the various interconnect components in an integrated circuit and configuring them, is referred to as interconnect (NoC) synthesis. As the number of connected modules increases, a software tool is needed to design the topology of the interconnection between these various components and then configure the interconnect (including routing) so that the user constraints are met, the overall logic and wiring cost is kept low and power consumption is minimized.

A Virtual Channel (VC) is a Time Division Multiplexed (TDM) slice of a physical channel (or link) in a network. Information passing between modules of the network is referred to as 'traffic'. An important part of NoC interconnect synthesis is the assignment of VCs to traffic entries in a specification of a network. This may be achieved, for example, by assigning VCs to the transmit ports of network Bridges.

VC assignment can have significant impact on the overall on the power, performance and area (abbreviated as 'PPA') of the NoC. Poor assignment can lead to Head-of-Line (HoL) blocking across various traffic classes, which reduces NoC performance. Head-of-Line blocking occurs, for example, when sequence of packets from a first traffic class is blocked due to packets of a second traffic class, although route for first traffic class is clear. HoL blocking may occur for many reasons, one example is, when there is sharing of physical link and a virtual channel across conflicting traffic classes. Still further, VC assignment can increase or reduce opportunities for fine-grained clock gating, due to mixing of 'bursty' and 'non-bursty' traffic, for example. Here, 'bursty' traffic refers to network traffic where the information packets are sent in bursts. For example, a number of packets may be sent in quick succession following a signal, followed by a period of little or no traffic.

One approach to VC assignment is a brute-force computer search. However, an exhaustive search is a nondeterministic polynomial (NP) hard problem, since the search time is not bounded by a polynomial of the number of modules. Other approaches, such as a manual design, are effort intensive and error prone and may not provide the most effective solution. For example, the resulting VC count may be greater than required.

Accordingly, there exist a need for a design tool that produces efficient VC assignment in a NoC.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

The various apparatus and devices described herein provide a design tool for virtual channel assignment in a Network-on-Chip.

In accordance with certain representative embodiments of the present disclosure, there is provided a method for assigning virtual channels in a network having a number of virtual channels. The method includes constructing a Traffic Conflict Graph (TCG) dependent upon interconnect topology, where the TCG comprises a number of vertices corresponding to traffic entries in a specification, and one or more edges that connect pairs of vertices of the vertices. Weights are assigned to each the one or more edges and the vertices are colored using a minimum number of colors, such that connected vertices are assigned different colors. When the resulting number of colors is greater than number of virtual channels in the system, a soft coloring the vertices is performed to minimize a sum of all edge weights for which vertices connected by the edge are assigned the same color. Finally, the virtual channels are mapped to the traffic entries according to the colors assigned to the vertices.

While this disclosure is susceptible of embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

As used herein, the term processor, controller or the like may encompass a processor, controller, microcontroller unit (MCU), microprocessor, and other suitable control elements. It will be appreciated that embodiments of the disclosure described herein may be comprised of one or more conventional processors and unique stored program instructions that control the one or more processors to implement, in conjunction with certain non-processor circuits, some, most, or all of the functions described herein. The non-processor circuits may include, but are not limited to, signal drivers, clock circuits, power source circuits, and user input devices. As such, these functions may be interpreted as a method to perform functions in accordance with certain embodiments consistent with the present disclosure. Alternatively, some or all functions could be implemented by a state machine that has no stored program instructions, or in one or more application specific integrated circuits (ASICs), in which each function or some combinations of certain of the functions are implemented as custom logic. Of course, a combination of these approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

A Network-on-Chip (NoC) is a packet switched interconnect. Advantages of a NoC are that it is scalable can and lead to better link utilization than other interconnect techniques, such as crossbar switches or buses. A NoC can provide optimal cost, while handling disparate traffic needs. In addition, a NoC can provide improved performance, improved power efficiency and a shorter time to market.

Figure 1:
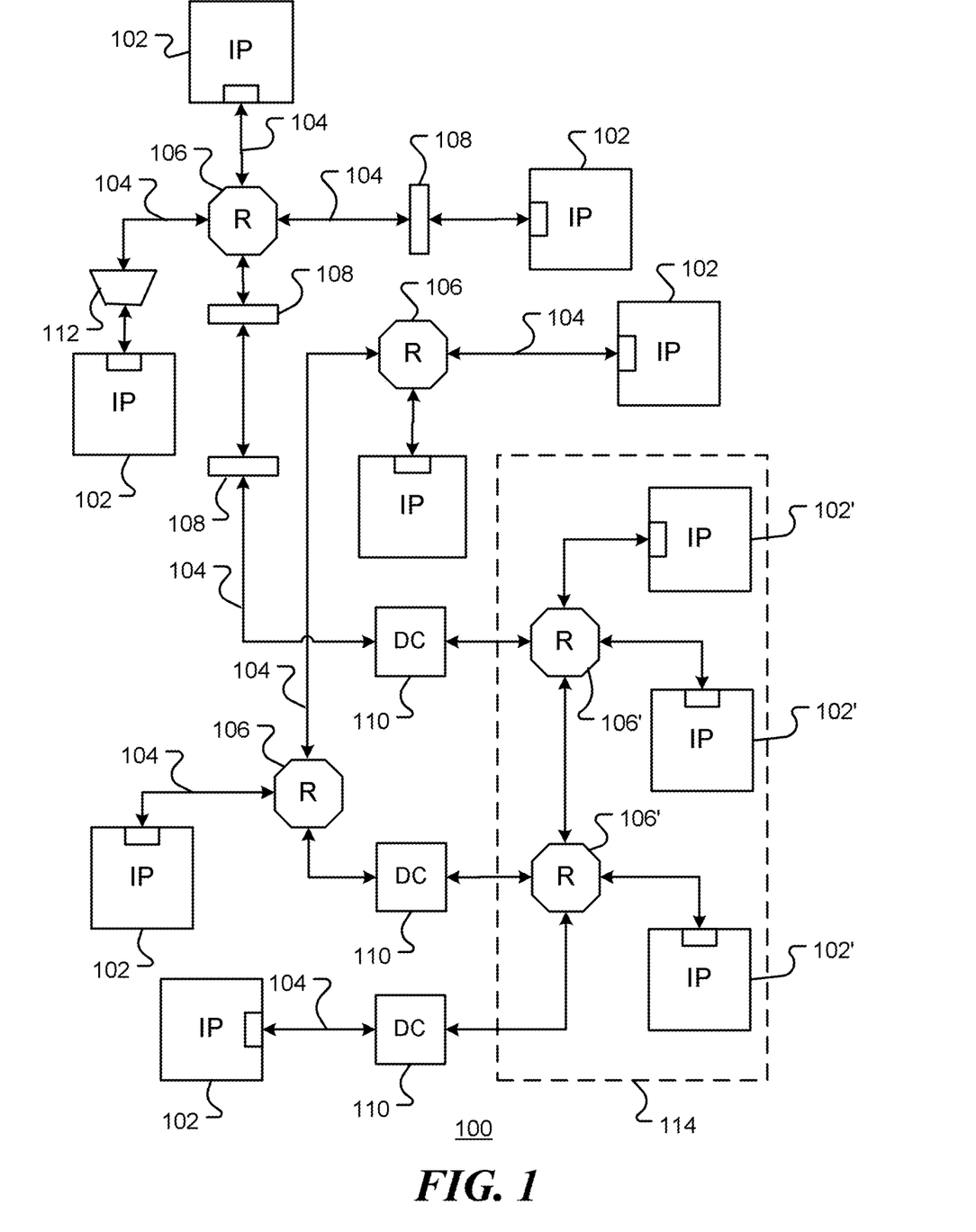
FIG. 1 is a block diagram of an example of a Network-on-Chip.

FIG. 1 is a block diagram of an example of a Network-on-Chip (NoC) 100. The network comprises a number of modules 102, 102', which are also referred to as Intellectual Property (IP) cores or simply IPs. In turn, a module 102 may contain a number of smaller modules. The modules 102 are physically interconnected via a network of links 104 and Routers 106, 106' (denoted by 'R' in the figure). Information may be passed between modules in packets. Each packet contains the address of the destination node that the Routers use to forward the packet on a route through the network. Thus, each route comprises a number of links and routers. The IP cores 102 are coupled to the interconnect via interfaces that are referred to herein as 'Bridges'. However, any type of interface maybe be used and the term 'Bridge' should be understood as including all types of information interfaces. A Bridge may include one or more transmitting (TX) ports that provide information packets to the interconnect and one or more receiving (RX) ports that receive information packets from the interconnect. Packets may be split into a number of 'flits' (flow controlled units) for transmission through the interconnect that are directed through the interconnect by the Routers. In addition to Routers, NoC 100 may include pipeline/register slice elements 108, domain converters (DCs) 110 and Up-sizers/Down-sizers 112. A domain converter 110 may be a clock domain converter (such as an asynchronous FIFO (first-in-first-out) buffer, for example) to enable a region 114 of the network to operate at a different clock rate. A domain converter 110 may also be power domain converter to enable a region of the network to operate at a different power or voltage level. Up-sizers/Down-sizers 112 enable regions of the network to operate with different width links by increasing the link width (up-sizing) in one direction and decreasing the link width (down-sizing) in the other direction. Thus, IP cores 102' and Routers 106' in region 114 can operate in a different clock/power/voltage domain than IP cores 102 and Routers 106 outside of region 114.

A design process for a Network-on-Chip may include:
Interconnect topology and routing.
Virtual Channel (resource plane) assignment.
Optimally configured IPs: Bridges, Router etc.
Pipeline insertion.
Link sizing and insertion of Up-sizer/Down-sizer components.
Efficient assignment of clock domains and power domains.
Insertion of Clock and Power domain converters, as needed.
Calculation of optimal buffer depth based on traffic.

A virtual channel assignment generated in the design process is provided as output. The assignment may provide an input for subsequent stages of the design and provide a specification for configuring hardware constructed in accordance with the design.

In accordance with an embodiment of the disclosed design approach, a virtual channel (VC) assignment task operates on a Graph Data Structure, called a Traffic Conflict Graph (TCG). Graph Algorithms are known in the field of Computer Science and a number of algorithms for such analysis are known to those of skill in the art. However, the analysis is augmented for application to VC channel assignment. As will be described below, both Head-of-Line (HoL) and power penalties due to mixing of conflicting traffic types and are represented in the TCG, so the TCG provides a global view of the assignment task.

In the example embodiments described below, an interconnect traffic flow is specified by the required Quality of Service (QoS), the sensitivity of the flow to latency and temporal distribution of the flow (such as whether it occurs in bursts). These properties may be described in a network specification, which may be provided in a computer readable such as an extensible markup language (XML) file or the like.

Once the TCG has been formed, it is determined if a minimum vertex coloring can be achieved. If so, the coloring is mapped to VC assignments. If minimum vertex coloring cannot be achieved, due to insufficient number of VCs for example, Head-of-Line blocking and power are minimized using an augmented soft coloring technique. Any remaining conflicts may be removed by inserting parallel links based on user inputs.

The following disclosure describes an embodiment where virtual channels are assigned between traffic originating Bridge ports (Bridge TX ports) and traffic receiving Bridge ports (Bridge RX ports). However, the approach may be applied to assigning channels between any network elements or, more generally, to assigning virtual channels to traffic entries in a network specification.

A traffic entry in a network specification describes traffic parameters, such as traffic rate, quality of service (QoS), latency sensitivity (LS) and protocol information, from a source port (such as a Bridge TX port) to a destination port (such as Bridge RX port). For example, a traffic entry may take the form:

<traffic_entry_name>: {
  src: <source port>,
  dst: <destination port>,
  avg: <average traffic rate>,
  peak: <peak traffic rate>,
  ls: <true/false>,
  qos: <quality-of-service level>,
  type: <read/write/request/response>}

Examples entries are:
u_s_ce0_u_m_base_rd: {
  src: u_s_ce0,
  dst: u_m_base,
  avg: 0.1,
  peak: 5,
  ls: false,
  qos: 0,
  type: readRequest}
u_s_ce1_u_m_base_wr: {
  src: u_s_ce1,
  dst: u_m_base,
  avg: 4,
  peak: 5,
  ls: true,
  qos: 2,
  type: writeRequest}

A Bridge TX port (source port) may have multiple VCs assigned, one for each traffic entry. Thus, the TCG may have vertices corresponding to traffic entries.

The description below is for an example in which a single VC is assigned to each Bridge TX Port. Hence, there is a one-to-one correspondence between Bridge TX Ports and traffic entries. However, it will be apparent to those of ordinary skill in the art that the method may be applied to assign VCs to traffic entries, and that Bridge TX Ports and other network elements may have multiple traffic entries.

Figure 2:
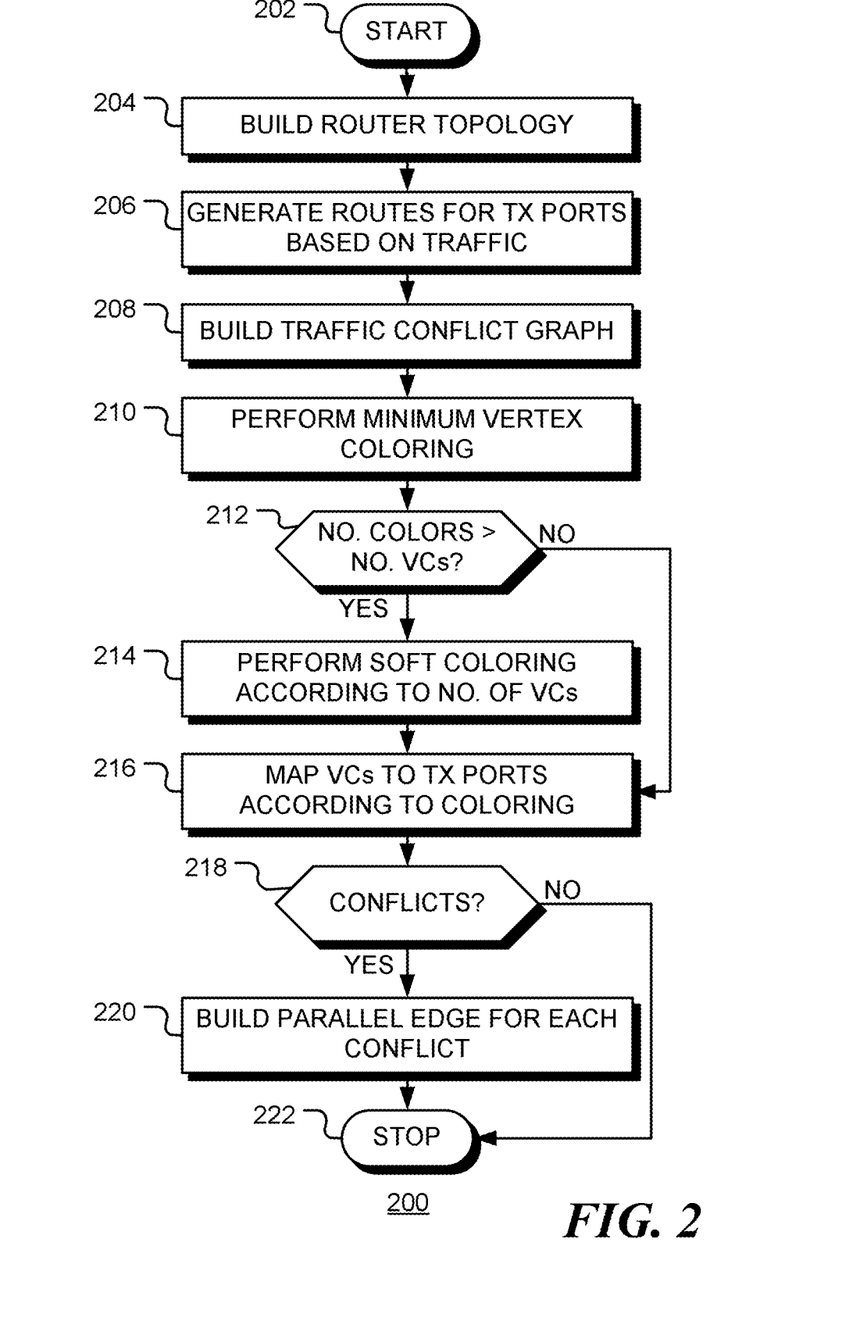
FIG. 2 is a flow chart of a method for virtual channel assignment, consistent with disclosed embodiments.

FIG. 2 is a flow chart of a method 200 for virtual channel (VC) assignment in accordance with an embodiment. Following start block 202, an interconnect topology is built at block 204 in accordance with a specification or other user input. In the topology, each traffic originating Bridge port (Bridge TX port) is connected to a traffic receiving Bridge port (Bridge RX port), via a route that include one or more Routers. A route may also include one or more other network elements, such as pipelines, up-sizers/down-sizers, power/voltage/clock converters, etc.

The topology includes a node corresponding to each Bridge port and a node corresponding to each Router together with the links or edges between them. At block 206, routes for all Bridge TX ports are generated, based on the specified traffic flow. At block 208, an un-directed Traffic Conflict Graph (TCG) is constructed. An example of this process is described below with reference to FIG. 3. Minimum vertex coloring is performed on the constructed TCG at block 210, where colors are assigned to the vertices such that no connected vertices have the same color. Various algorithms for performing the coloring are known in the field of computer science art. If the resulting number of colors used is greater than number of VCs in the system, as depicted by the positive branch from decision block 212, soft coloring of the TCG is performed at block 214. In the soft coloring process, the number of colors is limited to the number of virtual channels in the system. The goal of the soft coloring is to minimize total sum of all edge weights for which vertices connected by an edge are assigned the same color. In contrast, traditional (minimum) coloring seeks to have no pair of vertices of the same color connected by an edge.

At block 216, the virtual channels are mapped to the Bridge TX ports according to the resulting color assignment.

If the coloring results in a conflict, as depicted by the positive branch from decision block 218, a parallel edge is built for each edge/virtual channel conflict at block 220. The method terminates at block 222, with all of the virtual channels assigned.

The Network-on-Chip may be fabricated in an integrated circuit. The fabricated NoC may then be configured according to the virtual channels assigned by the method described above.

Figure 3:
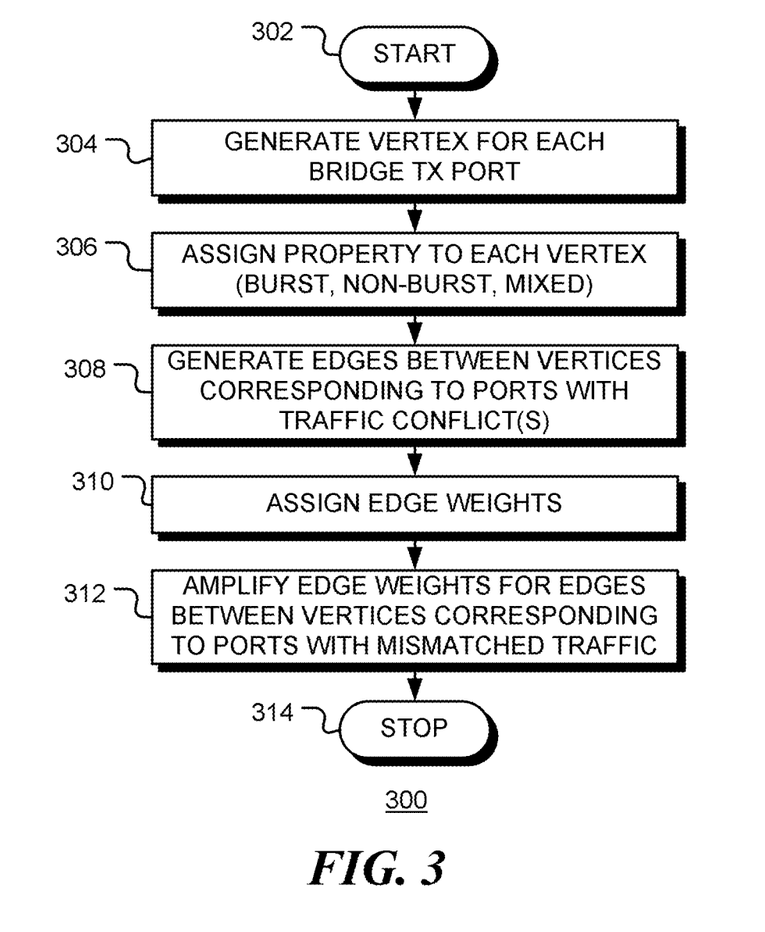
FIG. 3 is a flow chart of a method for constructing a traffic conflict graph (TCG) for use in assigning virtual channels in a Network-on-Chip, consistent with disclosed embodiments.

FIG. 3 is a flow chart 300 of a method for constructing a Traffic Conflict Graph (TCG) dependent upon an interconnect topology. Following start block 302, a vertex is generated in the TCG to represent each Bridge TX port at block 304 in the network specification. At block 306, a vertex property ('burst', 'non-burst' or 'mixed') is assigned to each vertex. At block 308, an edge is generated in the TCG between any pair of vertices of the TCG for which a number of qualified common edges, across all the routes originating from corresponding Bridge ports, is greater than zero. At block 310, an edge weight is assigned to each edge. In one embodiment, the edge weight is computed as a sum of all 'qualified' common edges, across all routes originating from the first and second Bridge TX ports. An edge between vertices corresponding to first and second Bridge TX ports is 'qualified' when traffic from the first Bridge TX port is in conflict with traffic from the second Bridge TX port. For example, traffic from the first Bridge TX port is in conflict with traffic from the second Bridge TX port when traffic from the first Bridge TX port is latency sensitive (LS) and traffic from the second Bridge TX port is non-latency sensitive (non-LS). Also, traffic from the first Bridge TX port is in conflict with traffic from the second Bridge TX port when traffic from the first Bridge TX port has a different Quality-of-Service specification than traffic from the second Bridge TX port. At block 312, edge weights of edges between vertices in the TCG are amplified or scaled by a constant factors when corresponding Bridge TX ports are specified 'burst' and 'non-burst'.

The edge weights in the TCG may be computed in other manners without departing from the present disclosure. An edge weight may be larger if a route includes more Routers and may be larger if the corresponding TX ports are mismatched (e.g. burst and non-burst, LS and non-LS, high QoS and lower QoS). In addition, an edge weight may be smaller if parallel routes exists (by analogy with a resistor network for example). In general, an edge weight is computed via a penalty function or cost function associated with a detrimental effect on the network of having to share a resource (physical link or virtual channel). The penalty or cost function, which may be referred to as simply a function to be optimized, may be chosen to relate to a chosen set of metrics by which the resulting interconnect will be judged.

Figure 4:
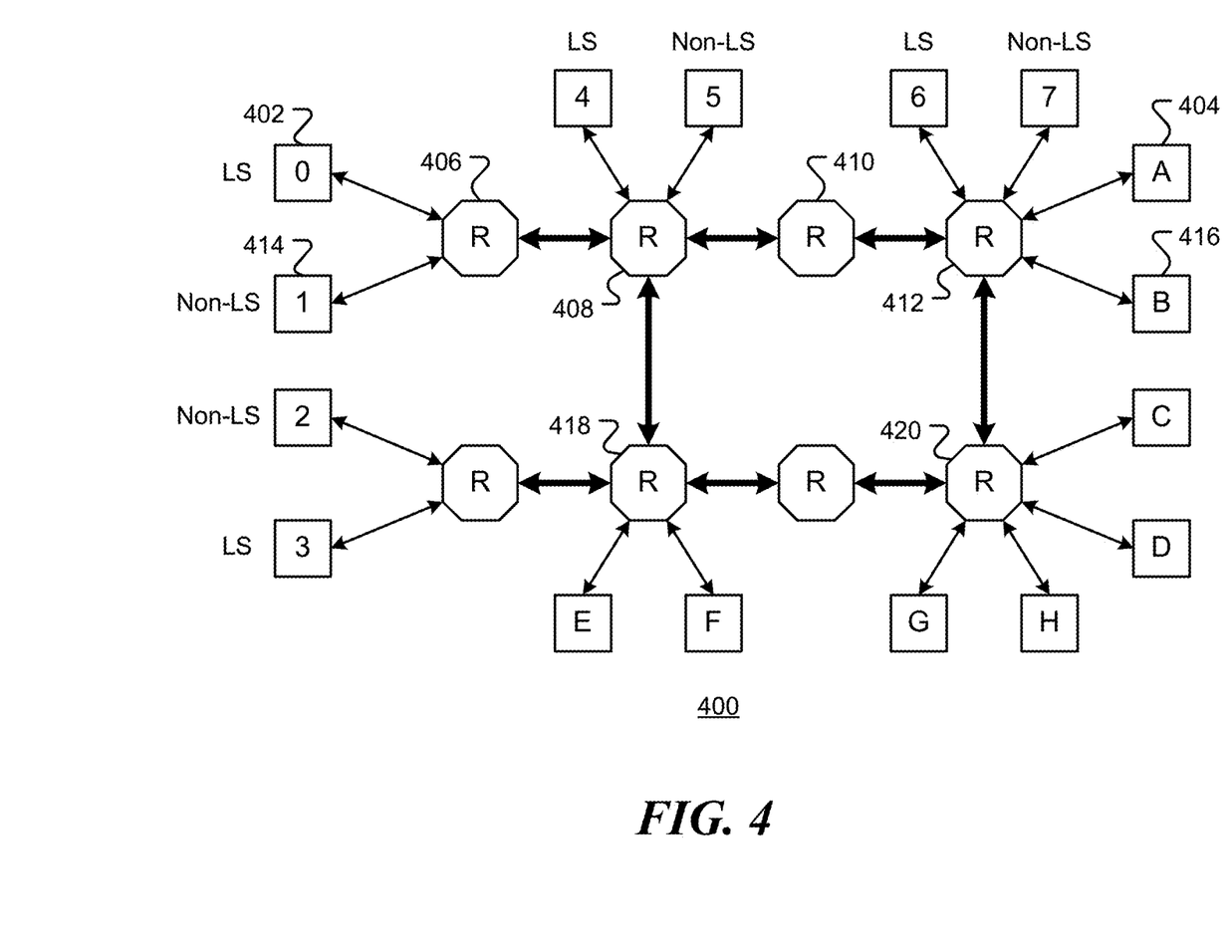
FIG. 4 is a block diagram showing an example of a topology of a network interconnect, consistent with disclosed embodiments.

FIG. 4 is a block diagram showing an example of an interconnect topology 400 of a network. Topology 400 may be defined in a specification provided by a designer, for example. The specification may be a computer readable form. Topology 400 includes a number of Bridge ports: Bridge TX ports 0-7 and Bridge RX ports A-H. The Bridge ports are interconnected via Routers, denoted by the letter 'R' in the figure. For example, TX port 0 (402) is coupled to RX port A (404) via Routers 406, 408, 410 and 412. In this example, traffic flow from TX port 0 (402) is specified as being latency sensitive (LS), indicating that information should be transmitted to the destination port with minimum delay. In contrast, port 1 (414), which is coupled to port B (416) via the same Routers (406, 408, 410 and 412) is specified being as non-latency-sensitive (non-LS), indicating less sensitivity to delays in information transfer.

In the example shown in FIG. 4, a traffic conflict exists because ports 0 and 1 both need to transmit information over the same route. Other conflicts exist when ports 2 and 3 use the same route (through the lower four Routers) to transmit packets to ports C and D, respectively, ports 4 and 5 use the same route (through Routers 408 and 418) to transmit packets to ports E and F, respectively, and ports 6 and 7 use the same route (through Routers 412 and 420) to transmit packets to ports G and H, respectively. The routes with conflicts are depicted by the bold arrows in FIG. 4, and will be represented in the traffic conflict graph derived from the topology. The links or connecting lines in FIG. 4 are referred to as 'edges'.

Figure 5A:
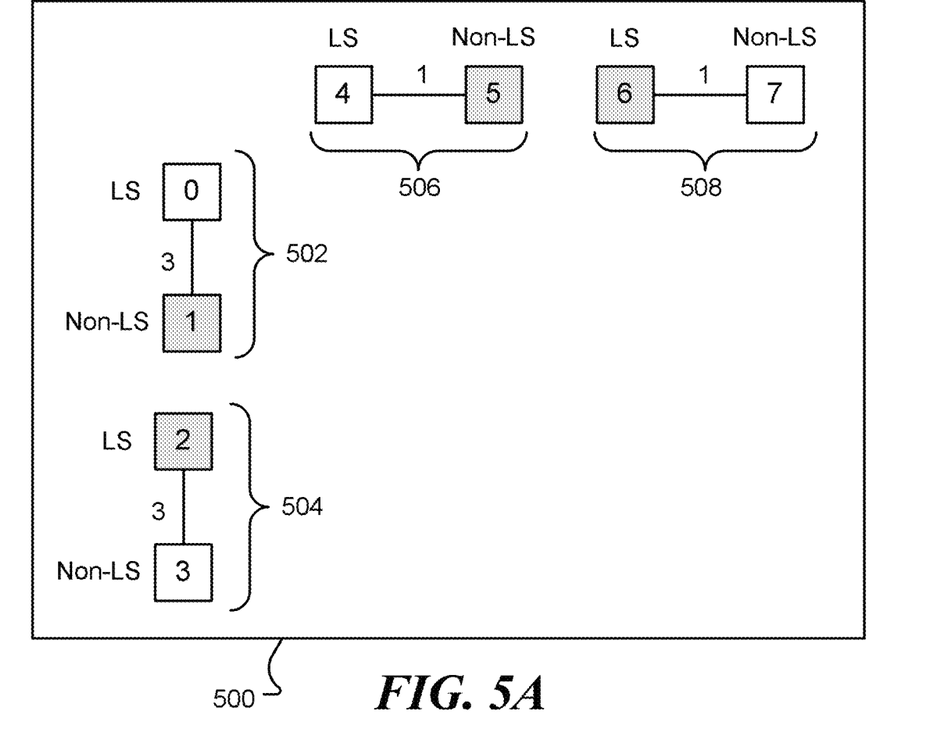
FIG. 5A shows an example traffic conflict graph, consistent with disclosed embodiments.

FIG. 5A shows an example traffic conflict graph (TCG) 500 derived from the topology shown in FIG. 4. TCG 500 includes a vertex for each of the Bridge TX ports in the topology. The vertices are labeled 0-7 to correspond to the TX ports in FIG. 4. TCG 500 also includes an edge (line) between any two vertices for which the number of qualified common edges, across all the routes originating from the nodes is greater than zero, where an edge is 'qualified' if traffic flows from the TX ports are in conflict with each other. For example, element 502 shows vertices 0 and 1 coupled by an edge, since TX port 0 is latency sensitive (LS) and TX port 1 is non-latency sensitive (non-LS) and they share a common edge in FIG. 4. Similarly, TCG 500 includes element 504 since traffic flows from TX ports 2 and 3 are in conflict, element 506 since traffic flows from TX ports 4 and 5 are in conflict, and element 508 since traffic flows from TX ports 6 and 7 are in conflict.

The edge weight may be computed as a sum of the of 'qualified' common edges, across all the routes, originating from the nodes. For example, TX ports 0 and 1 share 3 common edges in the route, so the edge weight is 3 for element 502, while TX ports 4 and 5 share a single common edge, so the edge weight is 1 for element 506. In other embodiments, the edge weight is computed as some other function of the number of qualified edges.

In this simple example, the links are only between Bridge TX ports and Routers. However, more generally, the network may contain other components as described above with reference to FIG. 1. The edge weight for a route may comprise the total number of links in the route, including links between other network elements.

The edge weights may be amplified or scaled with a constant factor if its adjacent vertices correspond with TX ports that are either (i) 'burst' and 'non-burst', or (ii) 'non-burst' and 'burst'.

Once the TCG is constructed, minimum vertex coloring is performed on the graph. In the simple graph shown in FIG. 5A, two colors are sufficient to color the vertices. The vertex colors are shown as white and gray in the figure. However, if the resulting number of colors is greater than number of virtual channels in the system, soft coloring of the TCG would be performed. In the soft coloring, the number of colors is limited to the number of virtual channels in the system.

Figure 5B:
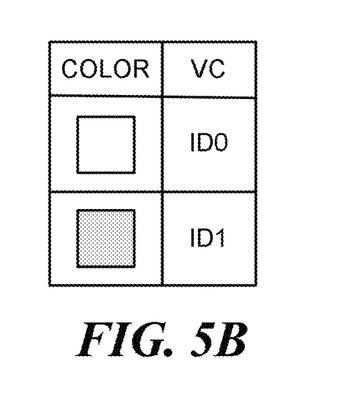
FIG. 5B shows an example of a mapping between vertex colors in a traffic conflict graph and virtual channels, consistent with disclosed embodiments.

The virtual channels are mapped to the Bridge TX ports according to the resulting color assignment, as shown in FIG. 5B. In this example, 'white' is mapped to virtual channel (VC) with identifier 'ID0', and 'gray' is mapped to VC with identifier 'ID1'.

Figure 5C:
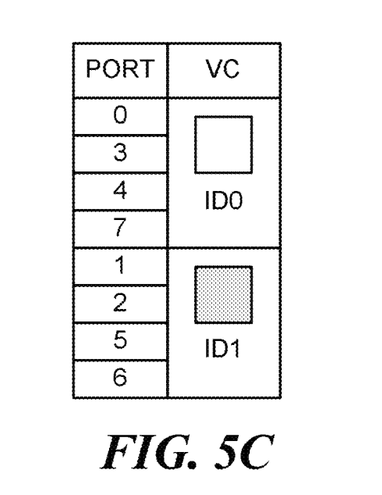
FIG. 5C shows an example of an assignment of virtual channels in a network, consistent with disclosed embodiments.

The Bridge TX ports are then assigned to the virtual channels as shown in FIG. 5C. In this example, TX ports 0, 3, 4 and 7 are assigned to channel ID0 and TX ports 1, 2, 5 and 6 are assigned to channel ID1. In this manner, all of the TX ports are assigned to virtual channels.

Figure 6:
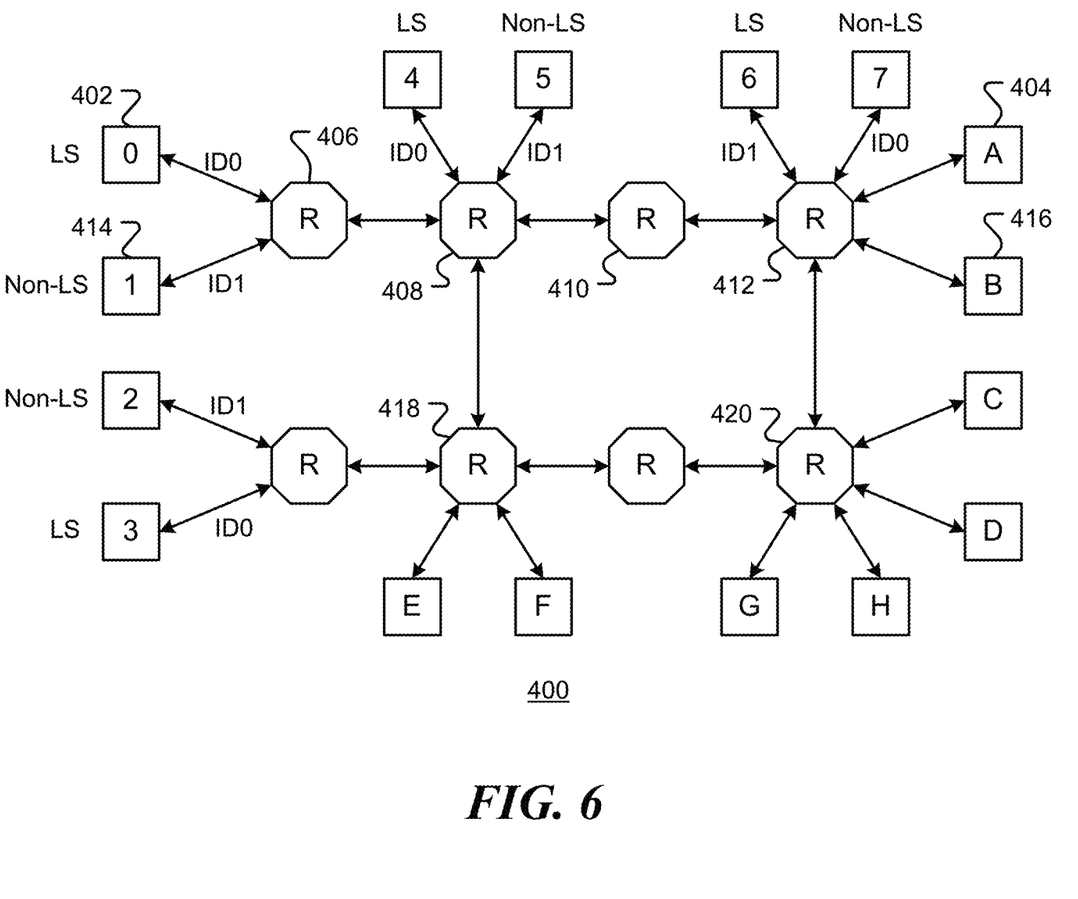
FIG. 6 shows an example of virtual channel assignments in an interconnect topology, consistent with disclosed embodiments.

FIG. 6 shows the resulting virtual channel assignments in the interconnect topology 400 of the network. Each if the ports 0-7 is labeled with a corresponding virtual channel identifier (ID0 or ID1).

Figure 7:
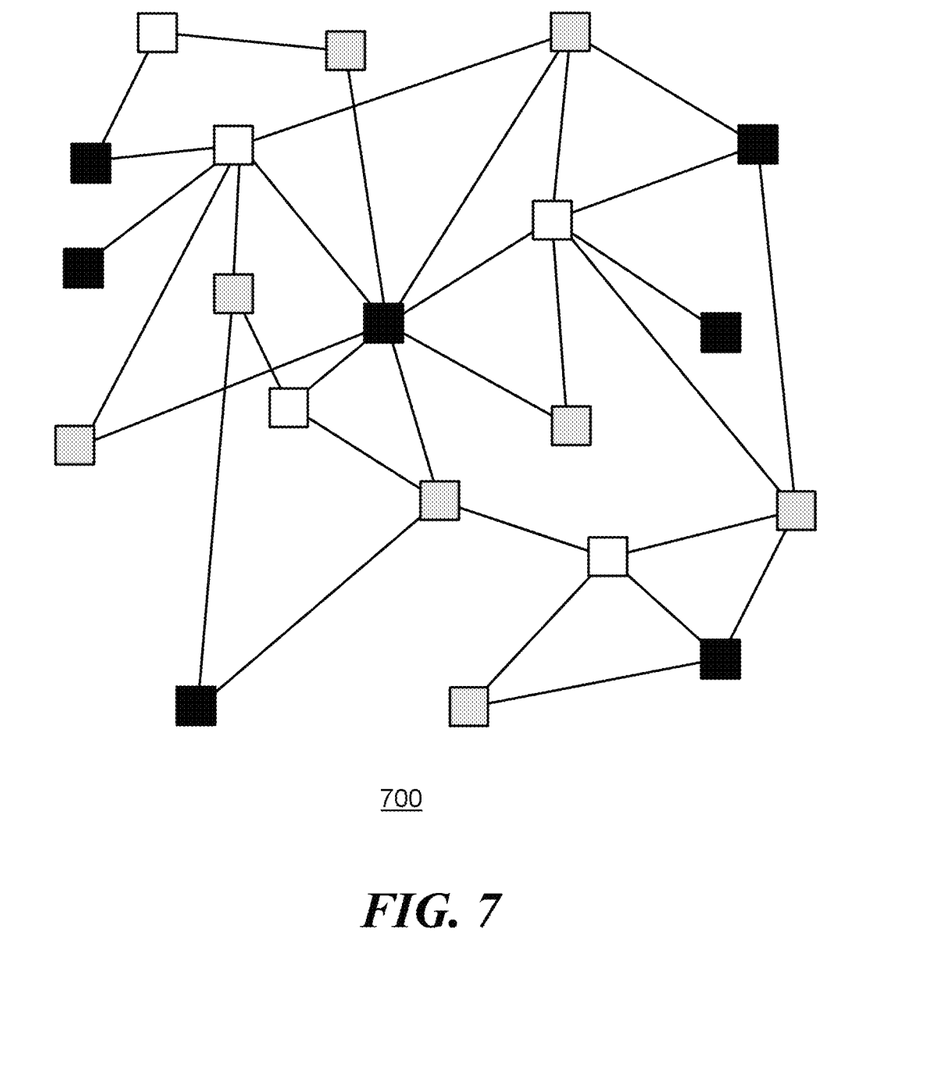
FIG. 7 is an example of minimum vertex coloring in a traffic conflict graph, consistent with disclosed embodiments.

FIG. 7 is an example of vertex coloring in a traffic conflict graph 700, consistent with disclosed embodiments. In the example shown, the vertices of the traffic conflict graph are assigned one of three colors (black, white and gray) corresponding to the three virtual channels of the network. In this example, a minimum coloring has been achieved, in which no two directly coupled vertices have the same color.

Figure 8:
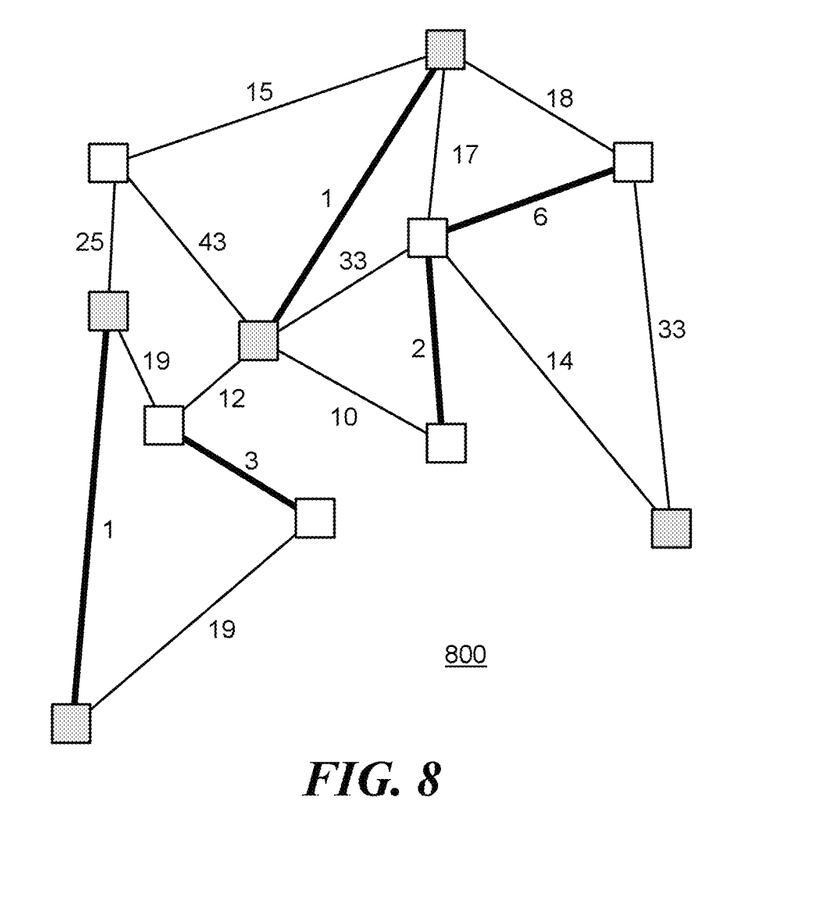
FIG. 8 is an example of soft vertex coloring in a traffic conflict graph, consistent with disclosed embodiments.

FIG. 8 is an example of soft vertex coloring in a traffic conflict graph 800, consistent with disclosed embodiments. In this example, the network has two virtual channels and a two-color coloring of the traffic conflict graph is not achievable. Accordingly, a soft coloring is used. Edges connecting pairs of vertices having the same color are indicated in the figure by the bold lines. The numbers adjacent each edge indicate the associated edge weight. The soft coloring minimizes the sum of edge weights that couple vertices of the same color. In this example, the minimized sum (for the bold edges) is 1+3+2+6+1=13.

Figure 9:
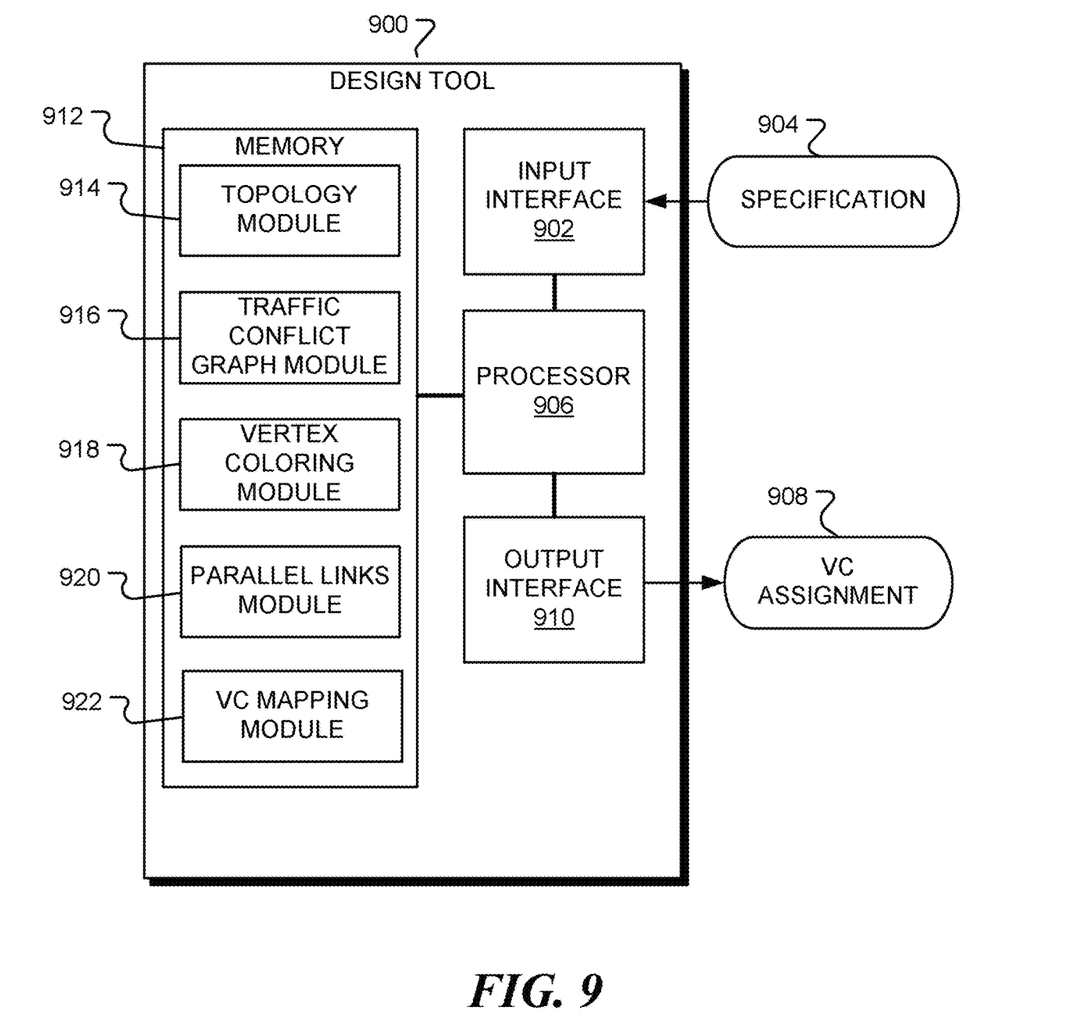
FIG. 9 is a block diagram of a design tool for virtual channel assignment in a network, consistent with disclosed embodiments.

FIG. 9 is a block diagram of a design tool 900 for virtual channel assignment in a network, consistent with disclosed embodiments. Design tool 900 receives, at input interface 902, a topology and traffic flow specification 904 for an interconnect. Specification 904 may include, for example, traffic information such as average and/or peak rates, latency criticality and QoS. Specification 904 may also include physical information, Bridges position and parameters, Voltage, Power and Clock domains, Topological constraints and refinement. From specification 904, processor 906 of the design tool determines virtual channel assignments 908 for the interconnect that are provided at output interface 910. The assignments may be used in other stages of network synthesis and also to assign virtual channels to TX ports in a fabricated network. Processor 906 is coupled to memory 912. When processor is a programmable processor, memory 912 may contains computer instructions that, when executed on the processor, configure the processor to determine virtual channel assignment from the specification 904. In the embodiment shown, the computer instructions are arranged as module 914 for building a topology of the network, module 916 for generating a traffic conflict graph from the topology and traffic flow specification, vertex coloring module 918 for assigning colors to the vertices of the traffic conflict graph, module 920 for adding parallel links, if needed, and VC mapping module 922 for mapping the vertex colors to virtual channels of the network. Module 920, for adding parallel links, may provide an interface for receiving user input so as to enable the user to determine what additional links are needed. Memory 912 may comprise a non-transitory computer readable medium.

The design tool 900 in an example embodiment of an apparatus that includes a memory 912 containing a program of instructions and a processor 906 coupled to the memory. Upon execution of the program of instructions, processor 906 is configured to construct a Traffic Conflict Graph (TCG) dependent upon an interconnect topology of a network, where the TCG comprises a plurality of vertices corresponding to Bridge transmitting (TX) ports of the network and one or more edges that connect pairs of vertices in the plurality of vertices. Next, the processor is configured to assign an edge weight to each of the one or more edges in the TCG, where the edge weight is dependent upon the interconnect topology and traffic flow characteristics between the Bridge TX ports of the network and Bridge receiving (RX) ports of the network. The processor then colors the plurality of vertices of the TCG using a minimum number of colors such that connected vertices are assigned different colors. When the resulting number of colors is greater than a specified number of virtual channels in the network, the processor soft colors the plurality of vertices of the TCG to minimize a cost function of edge weights for which vertices connected by the edge are assigned the same color. The virtual channels are then mapped to the Bridge TX ports according to the colors selected for the plurality of vertices of the TCG to provide a virtual channel assignment for the network. Finally, the virtual channel assignment for the network is output to facilitate further synthesis of the network.

Those skilled in the art will recognize that the present disclosure has been described in terms of exemplary embodiments based upon use of a programmed processor. However, the disclosure should not be so limited, since the present disclosure could be implemented using hardware component equivalents such as special purpose hardware and/or dedicated processors which are equivalents to the disclosure as described and claimed. Similarly, general purpose computers, microprocessor based computers, micro-controllers, optical computers, analog computers, dedicated processors and/or dedicated hard wired logic may be used to construct alternative equivalent embodiments of the present disclosure.

Moreover, those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using programmed processors executing programming instructions that are broadly described in flow chart form that can be stored on any suitable electronic storage medium or transmitted over any suitable electronic communication medium. However, those skilled in the art will appreciate that the processes described above can be implemented in any number of variations and in many suitable programming languages without departing from the present disclosure. For example, the order of certain operations carried out can often be varied, additional operations can be added or operations can be deleted without departing from the disclosure. Error trapping can be added and/or enhanced and variations can be made in user interface and information presentation without departing from the present disclosure. Such variations are contemplated and considered equivalent.

Accordingly, some aspects and features of the disclosed embodiments are set out in the following numbered items:

1. A method for assigning virtual channels in a network that couples between source ports and destination ports of network elements, the method comprising: constructing a Traffic Conflict Graph (TCG) dependent upon an interconnect topology of the network, where the TCG comprises a plurality of vertices corresponding to traffic entries in a specification of the network and one or more edges that connect pairs of vertices of the plurality of vertices; assigning an edge weight to each of the one or more edges in the TCG, where the edge weight is dependent upon the interconnect topology and traffic flow characteristics in a corresponding traffic entry; coloring the plurality of vertices of the TCG using a minimum number of colors, where connected vertices are assigned different colors; when a number of colors resulting from the coloring is greater than a specified number of virtual channels in the network: soft coloring the plurality of vertices of the TCG dependent upon a function of edge weights for which vertices connected by the edge are assigned the same color; mapping the virtual channels to the traffic entries according to the colors selected for the plurality of vertices of the TCG to provide a virtual channel assignment; and providing the virtual channel assignment as output.

2. The method of item 1, where a traffic entry in the specification comprises an identifier of a source port of a first network element, an identifier of a destination port of a second network element and one or more traffic flow characteristics.

3. The method of item 2, where a source port comprises a Bridge transmitting (TX) port and a destination port comprises a Bridge receiving (RX) port.

4. The method of item 1, where, in the interconnect topology, each source port of a traffic entry is connected to destination port of the traffic entry via a route comprising one or more Routers.

5. The method of item 4, where the route further comprises one or more network elements selected from a group of network elements consisting of: a clock domain converter; a power domain converter; an Up-sizer/Down-sizer and a pipeline.

6. The method of item 1, where the function upon which the soft coloring is dependent comprises a sum of all edge weights for which vertices connected by the edge are assigned the same color, and where the soft coloring minimizes the function.

7. The method of item 1, further comprising, when colors assigned to a pair of vertices of the TCG are in conflict: building a parallel edge for the pair of vertices in conflict.

8. The method of item 1, where constructing the Traffic Conflict Graph (TCG) dependent upon the interconnect topology comprises: generating a vertex in the TCG to represent each traffic entry; assigning a traffic flow characteristic of a first traffic entry to a corresponding first vertex in the TCG; assigning a traffic flow characteristic of a second traffic entry to a corresponding second vertex in the TCG; and generating an edge in the TCG between the first and second vertices when a number of 'qualified' common edges, across all routes for the first and second traffic entries, is greater than zero, where a common edge is 'qualified' when traffic flow for the first traffic entry is in conflict with traffic flow for the second traffic entry.

9. The method of item 8, where an edge weight assigned to an edge in the TCG is computed as a sum of all 'qualified' common edges, across all routes for the first and second traffic entries.

10. The method of item 8, where traffic flow for the first traffic entry is in conflict with traffic flow for the second traffic entry when traffic flow for the first traffic entry is latency sensitive (LS) and traffic flow for the second traffic entry is non-latency sensitive (non-LS).

11. The method of item 8, where traffic flow for the first traffic entry is in conflict with traffic flow for the second traffic entry when traffic flow for the first traffic entry has a different Quality-of-Service specification than traffic flow for the second traffic entry.

12. The method of item 8, further comprising: amplifying an edge weight of an edge between the first and second vertices in the TCG when traffic flows for corresponding first and second traffic entries are characterized as 'burst' and 'non-burst', respectively.

13. The method of item 1, further comprising: fabricating an integrated circuit that implements the network; and assigning the virtual channels to the fabricated network according to the virtual channel assignment.

14. A non-transient, computer readable medium storing programming instructions that, when executed on one or more processors, cause the one or more processors to perform the method of item 1.

15. An apparatus comprising: a memory storing a program of instructions; a processor coupled to the memory where, upon execution of the program of instructions, the processor is configured to: read a specification comprising a plurality of traffic entries, where a traffic entry of the specification comprises an identifier of a source port of a first network element, an identifier of a destination port of a second network element and one or more traffic flow characteristics; construct a Traffic Conflict Graph (TCG) dependent upon an interconnect topology of a network, where the TCG comprises a plurality of vertices corresponding to the plurality of traffic entries of the specification and one or more edges that connect pairs of vertices in the plurality of vertices; assign an edge weight to each of the one or more edges in the TCG, where the edge weight is dependent upon the interconnect topology and traffic flow characteristics for the plurality of traffic entries; color the plurality of vertices of the TCG using a minimum number of colors where connected vertices are assigned different colors; when the resulting number of colors is greater than a specified number of virtual channels in the network: soft color the plurality of vertices of the TCG dependent upon a function of edge weights for which vertices connected by the edge are assigned the same color; map the virtual channels to the plurality of traffic entries according to the colors selected for the plurality of vertices of the TCG, to provide a virtual channel assignment for the network; and output the virtual channel assignment for the network.

16. The apparatus of item 15, where, when colors assigned to a pair of vertices of the TCG are in conflict, the processor is further configured to build a parallel edge between the pair of vertices in conflict and to assign a virtual channel to the parallel edge.

17. The apparatus of item 15, further comprising an input interface for receiving the network specification.

18. The apparatus of item 15, where the processor is configured to construct the Traffic Conflict Graph (TCG) dependent upon the interconnect topology by: generating a vertex in the TCG to represent each traffic entry; assigning a traffic flow characteristic of a traffic entry to a corresponding vertex in the TCG; and generating an edge in the TCG between first and second two vertices of the TCG when a number of 'qualified' common edges, across all routes for corresponding first and second traffic entries, is greater than zero, where a common edge is 'qualified' when traffic flow for the first traffic entry is in conflict with traffic flow for the second traffic entry.

19. The apparatus of item 18, where traffic flow for the first traffic entry is in conflict with traffic flow for the second traffic entry when traffic flow for the first traffic entry is specified as latency sensitive (LS) and traffic flow for the second traffic entry is specified as non-latency sensitive.

20. The apparatus of item 18, where traffic flow for the first traffic entry is in conflict with traffic flow for the second traffic entry when traffic flow for the first traffic entry has a different Quality-of-Service specification than traffic flow for the second traffic entry.

21. The apparatus of item 15, where assigning the edge weight to an edge of the one or more edges in the TCG comprises: amplifying an edge weight of an edge between first and second vertices in the TCG when traffic flows from corresponding first and second traffic entries are characterized as 'burst' and 'non-burst', respectively.

22. An integrated circuit having a Network-on-Chip in which virtual channels of the Network-on-Chip are assigned by the apparatus of item 15.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A method for assigning virtual channels in a network that couples between source ports and destination ports of network elements, the method comprising:
   constructing a Traffic Conflict Graph (TCG) dependent upon an interconnect topology of the network, wherein the TCG comprises a plurality of vertices corresponding to traffic entries in a specification of the network and one or more edges that connect pairs of vertices of the plurality of vertices;
   wherein constructing the TCG dependent upon the interconnect topology of the network further comprises:

generating a vertex in the TCG to represent each traffic entry;

assigning a traffic flow characteristic of a first traffic entry to a corresponding first vertex in the TCG;

assigning a traffic flow characteristic of a second traffic entry to a corresponding second vertex in the TCG; and generating an edge in the TCG between the first and the second vertices when a number of qualified common edges, across all routes for the first and second traffic entries, is greater than zero, where a common edge is qualified when traffic flow for the first traffic entry is in conflict with traffic flow for the second traffic entry;

assigning an edge weight to each edge in the TCG, where the edge weight is dependent upon the interconnect topology and traffic flow characteristics in a corresponding traffic entry;

coloring the plurality of vertices of the TCG using a minimum number of colors, where connected vertices are assigned different colors;

when a number of colors resulting from the coloring is greater than a specified number of virtual channels in the network:

soft coloring the plurality of vertices of the TCG dependent upon a function of the edge weights for which vertices connected by the edge are assigned the same color;

mapping the virtual channels to the traffic entries according to the colors selected for the plurality of vertices of the TCG to provide a virtual channel assignment; and providing the virtual channel assignment as output.

2. The method of claim 1, wherein the traffic entry in the specification comprises an identifier of a source port of a first network element, an identifier of a destination port of a second network element and one or more traffic flow characteristics.

3. The method of claim 2, wherein the source port comprises a Bridge transmitting (TX) port and the destination port comprises a Bridge receiving (RX) port.

4. The method of claim 1, wherein, in the interconnect topology, the source port of a traffic entry is connected to the destination port of the traffic entry via a route comprising one or more Routers.

5. The method of claim 4, wherein the route further comprises one or more network elements selected from a group of network elements consisting of: a clock domain converter; a power domain converter; an Up-sizer/Down-sizer and a pipeline.

6. The method of claim 1, wherein the function upon which the soft coloring is dependent comprises a sum of all edge weights for which vertices connected by the edge are assigned the same color, and wherein the soft coloring minimizes the function.

7. The method of claim 1, further comprising, when colors assigned to a pair of vertices of the TCG are in conflict: building a parallel edge for the pair of vertices in conflict.

8. The method of claim 1, wherein the edge weight assigned to the edge in the TCG is computed as a sum of all 'qualified' common edges, across all routes for the first and the second traffic entries.

9. The method of claim 1, wherein traffic flow for the first traffic entry is in conflict with traffic flow for the second traffic entry when traffic flow for the first traffic entry is latency sensitive (LS) and traffic flow for the second traffic entry is non-latency sensitive (non-LS).

10. The method of claim 1, where traffic flow for the first traffic entry is in conflict with traffic flow for the second traffic entry when traffic flow for the first traffic entry has a different Quality-of-Service specification than traffic flow for the second traffic entry.

11. The method of claim 1, further comprising: amplifying the edge weight of an edge between the first and the second vertices in the TCG when traffic flows for corresponding first and second traffic entries are characterized as 'burst' and 'non-burst', respectively.

12. The method of claim 1, further comprising: fabricating an integrated circuit that implements the network; and assigning the virtual channels to the fabricated network according to the virtual channel assignment.

13. A non-transitory computer readable medium storing programming instructions that when executed by one or more processors, cause the one or more processors to perform a method comprising:

constructing a Traffic Conflict Graph (TCG) dependent upon an interconnect topology of the network, wherein the TCG comprises a plurality of vertices corresponding to traffic entries in a specification of the network and one or more edges that connect pairs of vertices of the plurality of vertices;

wherein constructing the TCG dependent upon the interconnect topology of the network further comprises:

generating a vertex in the TCG to represent each traffic entry;

assigning a traffic flow characteristic of a first traffic entry to a corresponding first vertex in the TCG;

assigning a traffic flow characteristic of a second traffic entry to a corresponding second vertex in the TCG; and generating an edge in the TCG between the first and second vertices when a number of qualified common edges, across all routes for the first and second traffic entries, is greater than zero, where a common edge is qualified when traffic flow for the first traffic entry is in conflict with traffic flow for the second traffic entry;

assigning an edge weight to each of the one or more edges in the TCG, where the edge weight is dependent upon the interconnect topology and traffic flow characteristics in a corresponding traffic entry;

coloring the plurality of vertices of the TCG using a minimum number of colors, where connected vertices are assigned different colors;

when a number of colors resulting from the coloring is greater than a specified number of virtual channels in the network:

soft coloring the plurality of vertices of the TCG dependent upon a function of edge weights for which vertices connected by the edge are assigned the same color;

mapping the virtual channels to the traffic entries according to the colors selected for the plurality of vertices of the TCG to provide a virtual channel assignment; and providing the virtual channel assignment as output.

14. An apparatus comprising:

a memory storing a program of instructions;

a processor coupled to the memory where, upon execution of the program of instructions, the processor is configured to:

read a specification comprising a plurality of traffic entries, where a traffic entry of the specification comprises an identifier of a source port of a first network element, an identifier of a destination port of a second network element and one or more traffic flow characteristics;

construct a Traffic Conflict Graph (TCG) dependent upon an interconnect topology of a network, where the TCG comprises a plurality of vertices corresponding to the plurality of traffic entries of the specification and one or more edges that connect pairs of vertices in the plurality of vertices;

wherein constructing the TCG dependent upon the interconnect topology of the network further comprises:

generating a vertex in the TCG to represent each traffic entry;

assigning a traffic flow characteristic of a first traffic entry to a corresponding first vertex in the TCG;

assigning a traffic flow characteristic of a second traffic entry to a corresponding second vertex in the TCG; and generating an edge in the TCG between the first and second vertices when a number of qualified common edges, across all routes for the first and second traffic entries, is greater than zero, where a common edge is qualified when traffic flow for the first traffic entry is in conflict with traffic flow for the second traffic entry;

assign an edge weight to each of the one or more edges in the TCG, where the edge weight is dependent upon the interconnect topology and traffic flow characteristics for the plurality of traffic entries;

color the plurality of vertices of the TCG using a minimum number of colors where connected vertices are assigned different colors;

when the resulting number of colors is greater than a specified number of virtual channels in the network:

soft color the plurality of vertices of the TCG dependent upon a function of edge weights for which vertices connected by the edge are assigned the same color;

map the virtual channels to the plurality of traffic entries according to the colors selected for the plurality of vertices of the TCG, to provide a virtual channel assignment for the network; and output the virtual channel assignment for the network.

15. The apparatus of claim 14, wherein, when colors assigned to a pair of vertices of the TCG are in conflict, the processor is further configured to build a parallel edge between the pair of vertices in conflict and to assign the virtual channel to the parallel edge.

16. The apparatus of claim 14, further comprising an input interface for receiving the network specification.

17. The apparatus of claim 14, where traffic flow for the first traffic entry is in conflict with traffic flow for the second traffic entry when traffic flow for the first traffic entry is specified as latency sensitive (LS) and traffic flow for the second traffic entry is specified as non-latency sensitive.

18. The apparatus of claim 14, wherein traffic flow for the first traffic entry is in conflict with traffic flow for the second traffic entry when traffic flow for the first traffic entry has a different Quality-of-Service specification than traffic flow for the second traffic entry.

19. The apparatus of claim 14, wherein assigning the edge weight to an edge of the one or more edges in the TCG comprises: amplifying the edge weight of an edge between the first and the second vertices in the TCG when traffic flows from corresponding first and second traffic entries are characterized as 'burst' and 'non-burst', respectively.

20. An integrated circuit having a network-on-chip and an apparatus configured to assign a virtual channel of the network-on-chip, the apparatus comprising:

a memory storing a program of instructions;

a processor coupled to the memory where, upon execution of the program of instructions, the processor is configured to:

read a specification comprising a plurality of traffic entries, where a traffic entry of the specification comprises an identifier of a source port of a first network element, an identifier of a destination port of a second network element and one or more traffic flow characteristics;

construct a Traffic Conflict Graph (TCG) dependent upon an interconnect topology of a network, where the TCG comprises a plurality of vertices corresponding to the plurality of traffic entries of the specification and one or more edges that connect pairs of vertices in the plurality of vertices;

wherein constructing the TCG dependent upon the interconnect topology of the network further comprises:

generating a vertex in the TCG to represent each traffic entry;

assigning a traffic flow characteristic of a first traffic entry to a corresponding first vertex in the TCG;

assigning a traffic flow characteristic of a second traffic entry to a corresponding second vertex in the TCG; and generating an edge in the TCG between the first and second vertices when a number of qualified common edges, across all routes for the first and second traffic entries, is greater than zero, where a common edge is qualified when traffic flow for the first traffic entry is in conflict with traffic flow for the second traffic entry;

assign an edge weight to each of the one or more edges in the TCG, where the edge weight is dependent upon the interconnect topology and traffic flow characteristics for the plurality of traffic entries;

color the plurality of vertices of the TCG using a minimum number of colors where connected vertices are assigned different colors;

when the resulting number of colors is greater than a specified number of virtual channels in the network:

soft color the plurality of vertices of the TCG dependent upon a function of edge weights for which vertices connected by the edge are assigned the same color;

map the virtual channels to the plurality of traffic entries according to the colors selected for the plurality of vertices of the TCG, to provide the virtual channel assignment for the network; and output the virtual channel assignment for the network.

\* \* \* \* \*